United States Patent Office 3,231,548
Patented Jan. 25, 1966

3,231,548
N-VINYL DERIVATIVES OF RING-OXYGENATED LACTAMS
Jesse T. Dunn, Charleston, W. Va., assignor to Union Carbide Corporation, a corporation of New York
No Drawing. Filed Apr. 24, 1959, Ser. No. 808,590
28 Claims. (Cl. 260—85.5)

This invention relates to novel N-vinyl lactam compounds as new compositions of matter, and to processes for their production. More particularly, this invention is concerned with N-vinyl derivatives of ring-oxygenated lactams as new compositions of matter, and with processes for their production.

The novel N-vinyl ring-oxygenated lactams of this invention can be graphically depicted by the formula

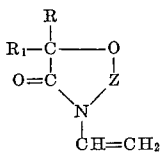

wherein Z represents $-C(R_2)(R_3)-$ or $-C(R_2)(R_3)-C(R_4)(R_5)-$, and R, $R_1$, $R_2$, $R_3$, $R_4$ and $R_5$ represent a hydrogen atom or a hydrocarbon radical, including alkyl radicals such as methyl, ethyl, propyl, isopropyl, butyl, isobutyl, pentyl, octadecyl and the like, cycloalkyl radicals such as cyclopropyl, cyclobutyl, cyclopentyl, cyclohexyl and the like, alkenyl radicals such as allyl, butenyl, pentenyl and the like, aryl radicals such as phenyl, naphthyl and the like, alkaryl radicals such as tolyl, xylyl, mesityl and the like, and aralkyl radicals such as benzyl, phenylethyl, phenylpropyl, diphenylmethyl and the like. Illustrative examples of the N-vinyl ring-oxygenated lactams of this invention include N-vinyl-3-morpholinone which can be represented by the formula

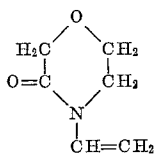

and 2,2,5,5 - tetramethyl-N-vinyloxazolidinone-4 which can be represented by the formula

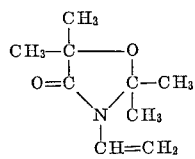

and such compounds as 3-methyl-N-vinyl-morpholinone-3, 2-ethyl-6-cyclobutyl-M-vinyl-morpholinone-3, 2-allyl-3-ethyl-N - vinyl-morpholinone-3, 3-propyl-6-phenyl-N-vinyl-morpholinone-3, 3-tolyl-6-allyl-N-vinyl - morpholinone - 3,2 - phenylethyl - 6 - methyl - N - vinyl - morpholinone-3, 2,3,6-trimethyl - N - vinyl-morpholinone-3, 2,5 - diallyl - 2,5 - dimethyl - N - vinyloxazolidinone-4, 2 - propyl - 5 - phenyl - N - vinyloxazolidinone - 4, 2-cyclobutyl - 5 - tolyl - N - vinyloxazolidinone-4, 2,5-ditolyl - 2,5 - dimethyl - N - vinyloxazolidinone - 4 and the like.

The novel N-vinyl ring-oxygenated lactams of this invention can be produced by forming a mixture of a ring-oxygenated lactam, acetylene and a suitable catalyst, and heating the mixture at an elevated temperature.

The ring-oxygenated lactams which can be employed as starting materials in preparing the novel compounds of this invention can be graphically depicted by the formula

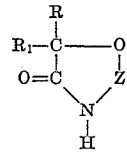

wherein Z, R, and $R_1$ are as above defined. Illustrative of such starting materials are 3-morpholinone which can be represented by the formula

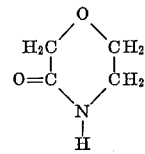

and 2,2,5,5-tetramethyloxazolidinone-4 which can be represented by the formula

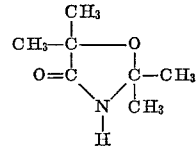

and such compounds as 3-methyl-morpholinone-3, 2-ethyl-6-cyclobutyl-morpholinone-3, 2-allyl - 3 - ethyl - morpholinone-3, 3-propyl-6-phenyl-morpholinone-3, 3 - tolyl - 6-allyl-morpholinone-3, 2-phenylethyl-6 - methyl - morpholinone-3, 2,3,6-trimethyl-morpholinone-3, 2,5-diallyl-2,5-dimethyloxazolidinone-4, 2-propyl-5-phenyloxazolidinone-4, 2-cyclobutyl-5-tolyl-oxazolidinone-4, 2,5-ditolyl-2, 5-dimethyloxazolidinone-4 and the like.

The ring-oxygenated lactams which can be employed as starting materials in praparing the novel compounds of this invention can be produced in various ways. By way of illustration, 3-morpholinone can be produced by the dehydrogenation of diethylene glycol to produce (2-hydroxyethoxy) acetic acid lactone, followed by the reaction of said lactone with ammonia to produce the desired 3-morpholinone. This can be illustrated by the following graphic equations showing the stepwise synthesis of 3-morpholinone.

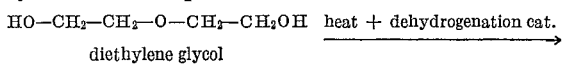

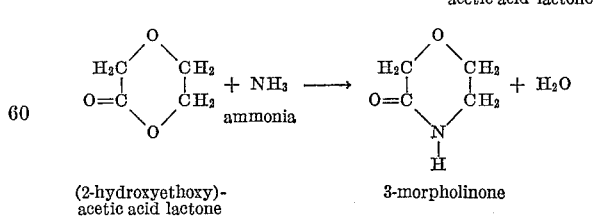

In like manner, by reacting ammonia with similar lactones having substituents other than hydrogen atoms, it is possible to prepare a wide variety of compounds which can be employed as starting materials in preparing the N-vinyl ring-oxygenated lactams of this invention.

An alternative method for producing ring-oxygenated lactams which can be employed as starting materials in preparing the novel compounds of this invention comprises heating a mixture of one or more cyanohydrin compounds and polyphosphoric acid at an elevated temperature to cause the cyanohydrin compounds present to react to produce the desired lactam. By way of illustration, 2,2,5,5-tetramethyloxazolidinone-4 can be produced by heating a mixture of acetone cyanohydrin and polyphosphoric acid at a temperature of about 85° C. This can be illustrated by the following graphic equation

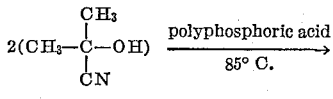

Acetone cyanohydrin

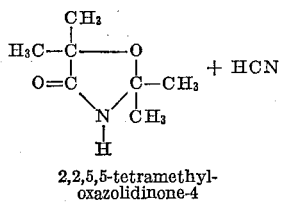

2,2,5,5-tetramethyl-oxazolidinone-4

By reacting similar cyanohydrin compounds having substituents other than methyl groups in like manner it is possible to prepare a wide variety of compounds which can be employed as starting materials in preparing the N-vinyl ring-oxygenated lactams of this invention.

It is also possible to produce ring-oxygenated lactams useful in preparing the novel compounds of this invention by the reaction of a cyanohydrin compound and an aldehyde or ketone. For example, 2,2,5,5-tetramethyl-oxazolidinone-4 can be produced by reacting acetone cyanohydrin and acetone in the presence of hydrogen chloride. This can be illustrated by the following graphic equation.

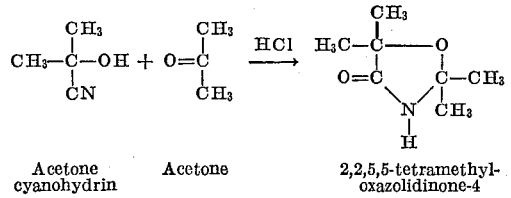

Acetone cyanohydrin    Acetone    2,2,5,5-tetramethyl-oxazolidinone-4

By reacting similar cyanohydrin compounds having substituents other than methyl groups with similar ketones (or aldehydes) having substituents other then methyl groups in the like manner it is possible to prepare a wide variety of compounds which can be employed as starting materials in preparing the N-vinyl ring-oxygenated lactams of this invention.

The process of the instant invention comprises reacting a ring-oxygenated lactam with acetylene in the presence of a suitable catalyst and can be illustrated by the following graphic equation

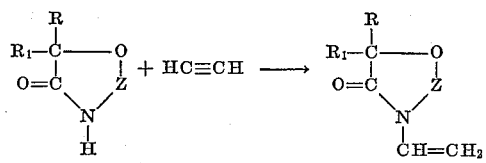

wherein Z, R, and $R_1$ are as above defined. Thus, for example, N-vinyl-3-morpholinone can be prepared by the reaction of the potassium metal salt of 3-morpholinone with acetylene, and 2,2,5,5-tetramethyl-N-vinyloxazolidinone-4 can be prepared by the reaction of the potassium metal salt of 2,2,5,5-tetramethyloxazolidinone-4 with acetylene.

In order to effect reaction between a ring oxygenated lactam and acetylene according to the process of the instant invention, it is necessary that an alkali metal salt of such lactam be present as catalyst. Preferably the potassium salt of such lactam is employed.

The amount of such alkali metal salt employed as catalyst in effecting reaction between a ring-oxygenated lactam and acetylene according to the process of the instant invention can vary from as low as about 0.5 percent by weight to as high as about 5 percent by weight, preferably from 1 percent by weight to 3 percent by weight, of the total weight of the reaction mixture. While amounts of catalyst both above and below the broadly disclosed range can also be employed, such concentrations of catalyst do not provide the advantages obtainable by operating within the indicated range.

Reaction according to the process of the instant invention readily occurs at temperatures ranging from as low as 110° C. to as high as 200° C. Preferably, reaction is effected at temperatures ranging from about 150° C. to about 170° C. Temperatures both above and below the broadly disclosed range can also be employed; however, such temperatures do not provide the advantages obtainable by operating within the temperaure range indicated above.

At the temperatures at which acetylene and ring-oxygenated lactams react according to the process of the instant invention, the former is gaseous at atmospheric pressure. Therefore, in order to maintain a high concentration of reactants (as measured for example in moles per liter of reactor space), the starting materials are preferably charged to a closed vessel which is sealed prior to heating to effect reaction. A suitable vessel for this purpose is an autoclave which may be of the "rocking" variety to provide agitation and better contact of reactants. Since the reaction that occurs is accompanied by a net decrease in volume as the reactants are converted to products, increased pressure favors the reaction and is preferred. To secure a suitable elevated pressure during the entire reaction, the reactor can be initially pressurized with acetylene, and further pressurized with more acetylene as the initial acetylene is consumed during the course of the reaction. Inert gases, such as nitrogen, can be added to the reactor in lieu of acetylene to help maintain the reactor pressure and to reduce the likelihood of acetylene detonation, but the acetylene concentration is correspondingly decreased thereby.

The pressure employed in effecting reaction according to the process of the instant invention usually can vary from a pressure of about 15 p.s.i. to a pressure of about 300 p.s.i., with the most suitable pressures ranging from about 100 p.s.i. to about 300 p.s.i. While pressures both above and below the broadly disclosed range can also be employed, pressures lower than 15 p.s.i. are usually not desirable due to the slow rate at which reaction proceeds under such conditions, while pressures higher than 300 p.s.i. are usually not desirable due to the hazard of acetylene detonation at such pressures.

Because of the acetylene detonation problem, when working at pressures above 25 p.s.i., it is usually preferable that at least part of the total pressure be due to the presence of an inert gas. While the reaction is preferably carried out using at least a stoichiometric amount of acetylene, it is not usually desirable to let the reaction go to completion because of the long reaction times required to accomplish this, and because such extended reaction periods can result in polymerization of the desired reaction product and a corresponding decrease in yield.

The preparation of N-vinyl ring-oxygenated lactams according to the process of the instant invention may be effected in an inert liquid solvent. This technique is especially preferred as an aid to reaction when the lactam employed as starting material is a solid. By an "inert" liquid solvent is meant a liquid solvent in which the starting materials are soluble to an extent whereby they are brought into reactive contact and which itself is non-reactive under the conditions of the reaction. Suitable inert liquid solvents which can be employed for such purpose include hydrocarbons such as hexane, cyclohexane, heptane, benzene, toluene and the like, and ethers such as dioxan, tetrahydrofuran and the like. Such inert liquid solvents are preferably employed in an anhydrous condition as the presence of moisture leads to undesirable side reactions. In gneral, an amount of solvent ranging from about 0.1 to about 50 times the weight of lactam starting material present can be effectively employed; however, inasmuch as it has been found that higher yields of product are obtained when lesser amounts of solvent are employed, it is preferable to use an amount of solvent ranging from about 0.1 to about 10 times the weight of lactam starting material present.

The N-vinyl ring-oxygenated lactams of this invention find wide use in the preparation of polymeric materials. By way of illustration, such compounds, because of the single vinyl group present, can be homopolymerized by heating in the presence of a suitable vinyl polymerization catalyst, such as azo-bis-isobutyronitrile, to produce homopolymers having molecules which consist of carbon chains with pendant hydrogen atoms and ring-oxygenated lactam groups. Certain of such homopolymers, such as the homopolymer of N-vinyl-3-morpholinone, are soluble in water. In addition, the N-vinyl ring-oxygenated lactams of this invention can be copolymerized with certain vinyl organic compounds such as vinyl chloride and acrylonitrile. Thus, 2,2,5,5-tetramethyl-N-vinyloxazolidinone-4 can be copolymerized with acrylonitrile to produce a copolymer having molecules which consist of carbon chains with pendant hydrogen atoms, 2,2,5,5-tetramethyloxazolidinone-4 groups, and nitrile groups.

The polymeric materials produced by polymerizing the N-vinyl ring-oxygenated lactams of this invention have been found useful as thickeners, sizes and coagulants. Thus, these polymers can be employed as thickeners for such substances as ice cream, mayonnaise, and toothpaste; as sizes for such substances as textiles and paper; and as coagulants, in the case of water-soluble polymers, for coal dust in the effluent from coal washing operations, for paper pulp in the "white water" effluent from paper mills, and for the fine solid particles in the effluent from sewerage treatment plants.

The following examples illustrate the preparation of materials which can be employed in preparing N-vinyl ring-oxygenated lactams in accordance with the process of the instant invention.

EXAMPLE I

*Preparation of 3-morpholinone*

To a three-liter stainless steel rocking autoclave were charged 255 grams of (2-hydroxyethoxy) acetic acid lactone (2.5 moles), 300 grams of anhydrous ammonia (17.6 moles), and 1000 ml. of dioxane. The autoclave was sealed and heated at a temperature of 300° C. for a period of 4.2 hours. Following this, the autoclave was drained, and the reaction mixture distilled. Ninety-five (95) grams of distillate boiling at a temperature range of 97–117° C. at 2 mm. Hg pressure were collected. The crude product thus obtained was allowed to cool and solidify, and was then crystallized twice from anhydrous ethanol. About 63 grams of pure 3-morpholinone were recovered (25 percent yield) in this manner. This material had a melting point of 104–106° C. and a molecular weight, as determined by the Menzies-Wright method, of about 108 (theoretical molecular weight 101). Chemical analysis showed a nitrogen content of 14.6 percent (theoretical nitrogen content 13.9 percent).

EXAMPLE II

*Preparation of 3-morpholinone*

To a three-liter stainless steel autoclave were charged 510 grams of 95 percent (2-hydroxyethoxy) acetic acid lactone (4.76 moles), and 427 grams of anhydrous ammonia (36.5 moles). The autoclave was sealed and heated at a temperature of 200° C. for a period of 3.5 hours. Following this, the autoclave was drained, and the reaction mixture distilled. Three hundred and eighty-two (382) grams of distillate boiling at a temperature range of 147–162° C. at 9–12 mm. Hg pressure were collected. The crude product thus obtained was allowed to cool and was then recrystallized from acetone. About 250 grams of 3-morpholinone were recovered (52 percent yield) in this manner. This material had a melting point of 106° C.

EXAMPLE III

*Preparation of 2,2,5,5-tetramethyloxazolidinone-4*

An admixture of 85 grams of acetone cyanohydrin (1 mole) and 116 grams of acetone (2 moles) was prepared and maintained at a temperature of 20° C. by cooling while anhydrous hydrogen chloride was sparged beneath the surface until the reaction mixture was saturated. About 254 grams of a 21 percent solution of aqueous ammonium hydroxide was then added to the mixture with continued cooling, thereby causing the pH of the resulting mixture to rise to approximately 8. The voluminous, colorless precipitate obtained by this procedure was then removed by filtration. One hundred and sixteenth (116) grams of 2,2,5,5-tetramethyloxazolidinone-4 were recovered in this manner. This represented a yield of about 81 percent of theoretical. This material had a melting point of 160–161° C.

The following examples of my invention are set forth for purposes of illustration so that those skilled in the art may better understand my invention, and it should be understood that they are not to be construed as limiting my invention in any manner. The term "reduced viscosity" employed in certain of the following examples indicates the value obtained by dividing the specific viscosity of a solution of polymer by the concentration of polymer in said solution (the concentration of polymer being expressed in grams of polymer per 100 milliliters of solvent). The specific viscosity of a solution at a given temperature is obtained by dividing the difference between the viscosity of the solution (as expressed in seconds necessary to pass through a capillary viscometer) and the viscosity of the solvent (as expressed in seconds necessary to pass through a capillary viscometer) by the viscosity of the solvent. A concentration of 0.2 gram of polymer 100 milliliters of solution was employed at a temperature of 30° C. in determining reduced viscosity in each of the following examples.

By determining reduced viscosity at varying concentrations of polymer and plotting these values against the concentrations at which they were determined, and extrapolating the reduced viscosity-concentration curve (straight line) to zero concentration of polymer, it is possible to determine the "intrinsic viscosity" of a polymer in a given solvent. The intrinsic viscosity ($I_0$) of a polymer in a given solvent has been found to be broadly related to its molecular weight (M) by the formula $$I_0 = KM^a$$

where K and $a$ are constant values for the given solvent.

EXAMPLE IV

*Preparation of N-vinyl-3-morpholinone*

An admixture of 461 grams of 3-morpholinone (4.57 moles) and 880 grams of benzene was prepared and refluxed to remove all traces of water (by means of a Dean-Stark trap). The hot, anhydrous solution obtained thereby was then refluxed under an atmosphere of nitrogen for a period of 24 hours while a total of 19 grams of potassium (0.49 gram atomic weights) were added from time to time in small portions with stirring. The resulting mixture was then charged to a three-liter stainless steel rocking autoclave. After purging with nitrogen gas, the autoclave was heated to a temperature of 160° C. and pressurized to a pressure of 150 p.s.i.g. with nitrogen gas. Following this, the pressure was increased by the admission of acetylene gas until a total pressure of 300 p.s.i.g. was attained. As the pressure within the autoclave decreased due to the reaction of acetylene, more acetylene was periodically introduced into the autoclave to reestablish a pressure of 300 p.s.i.g. After 3 hours, 19 more grams of potassium were added and the reaction was allowed to continue for an additional 2.5 hours under the conditions described. Upon cooling, the contents of the autoclave were filtered. The filtrate obtained thereby was then diluted with 2 liters of benzene, treated with activated carbon, filtered, and finally washed twice with 50 ml. portions of water (to remove traces of 3-morpholinone from the benzene). The washed filtrate was then distilled and 83 grams of product boiling at a temperature range of 67–72° C. at 0.5 mm. Hg pressure were recovered. Upon standing under atmospheric conditions, the distilled product crystallized in part. The crystals were filtered off from the remainder of the distillate and washed with a mixture containing 20 percent by weight benzene and 80 percent by weight cyclohexane. About 35 grams of pure N-vinyl-3-morpholinone having a melting point of 35–37° C. were recovered in this manner.

EXAMPLE V

*Preparation of 2,2,5,5-tetramethyl-N-vinyloxazolidinone-4*

An admixture of 700 grams of 2,2,5,5-tetramethyl-oxazolidinone-4 (4.9 moles) and 528 grams of toluene was prepared and refluxed to remove all traces of water (by means of a Dean-Stark trap). The hot, anhydrous mixture obtained thereby was then refluxed under an atmosphere of nitrogen for a period of 24 hours while a total of 27 grams of potassium (0.69 gram atomic weights) were added from time to time in small portions with stirring. After 200 ml. of toluene were removed by distillation, the residue was charged to a three-liter stainless steel rocking autoclave. After purging with nitrogen gas, the autoclave was heated to a temperature of 170° C. and pressurized to a pressure of 100 p.s.i.g. with nitrogen gas. Following this, the pressure was increased by the admission of acetylene gas until a total pressure of 300 p.s.i.g. was attained. As the pressure within the autoclave decreased due to the reaction of acetylene, more acetylene was periodically introduced into the autoclave to reestablish a pressure of 300 p.s.i.g. The reaction was allowed to continue for a total of 19 hours under the conditions described. Upon cooling, the reaction mixture was treated with activated carbon, filtered and distilled. About 722 grams of 2,2,5,5-tetramethyl-N-vinyloxazolidinone-4 boiling at a temperature of 62° C. at 3 mm. Hg pressure, were recoverd (87 percent yield). This material had a melting point of 43° C.

EXAMPLE VI

*Homopolymerization of N-vinyl-3-morpholinone*

To a Pyrex glass tube were charged 5 grams of N-vinyl-3-morpholinone, 5 ml. of toluene and 0.5 gram of azo-bis-isobutyronitrile. After purging with nitrogen, the tube was sealed and heated for 22 hours in a bath maintained at a temperature of 50° C. The tube was continuously rocked during this period. Upon cooling, ethyl ether was added to the solution and the precipitate obtained thereby was washed three times with ethyl ether and dried by heating at a temperature of 60° C. for 16 hours. About 1.35 grams of polymer were recovered in this manner. The polymer had a reduced viscosity of 0.09 in water.

EXAMPLE VII

*Copolymerization of N-vinyl-3-morpholinone with vinyl chloride*

To a Pyrex glass tube were charged 9.0 grams of vinyl chloride, 1.0 grams of N-vinyl-3-morpholinone and 0.1 gram of azo-bis-isobutyronitrile. After purging with nitrogen, the tube was sealed and heated for 11½ hours in a bath maintained at a temperature of 50° C. The tube was continuously rocked during this period. Upon cooling, isopropanol was added to the solution and the precipitate obtained thereby was washed three times with isopropanol and dried by heating at a temperature of 60° C. for 16 hours. About 2.1 grams of copolymer was recovered in this manner. Analysis showed the copolymer to be composed of 93.17 percent polyvinyl chloride and 6.83 percent N-vinyl-3-morpholinone. The copolymer is useful as a molding or film-forming material having improved heat stability.

EXAMPLE VIII

*Homopolymerization of 2,2,5,5-tetramethyl-N-vinyloxazolidinone-4*

To a Pyrex glass tube were charged 5 grams of 2,2,5,5-tetramethyl-N-vinyloxazolidinone-4, 5 ml. of acetone and 0.5 gram of azo-bis-isobutyronitrile. After purging with nitrogen, the tube was sealed and heated for 21⅓ hours in a bath maintained at a temperature of 50° C. The tube was continuously rocked during this period. Upon cooling, water was added to the solution and the precipitate obtained thereby was dried by heating at a temperature of 60° C. for 16 hours. About 1.31 grams of polymer were recovered in this manner. The polymer had a reduced viscosity of 0.18 in benzene.

EXAMPLE IX

*Copolymerization of 2,2,5,5-tetramethyl-N-vinyloxazolidinone-4 with acrylonitrile*

To a Pyrex glass tube were charged 6.0 grams of acrylonitrile, 4.0 grams of 2,2,5,5-tetramethyl-N-vinyloxazolidinone-4 and 0.1 gram of azo-bis-isobutyronitrile. After purging with nitrogen, the tube was sealed and heated for 6½ hours in a bath maintained at a temperature of 50° C. The tube was continuously rocked during this period. Upon cooling, isopropanol was added to the solution and the precipitate obtained thereby was washed three times with isopropanol and dried by heating at a temperature of 60° C. for 16 hours. About 1.38 grams of copolymer were recovered in this manner. Analysis showed the copolymer to be composed of 37.7 percent acrylonitrile and 62.3 percent 2,2,5,5-tetramethyl-N-vinyloxazolidinone-4. The polymer had a reduced viscosity of 1.66 in dimethyl formamide. This material can be used in preparing fibers.

EXAMPLE X

*Copolymerization of 2,2,5,5-tetramethyl-N-vinyloxazolidinone-4 with vinyl chloride*

To a Pyrex glass tube were charge 8.0 grams of vinyl chloride, 2.0 grams of 2,2,5,5-tetramethyl-N-vinyloxazolidinone-4 and 0.1 gram of azo-bis-isobutyronitrile. After purging with nitrogen, the tube was sealed and heated for 9½ hours in a bath maintained at a temperature of 50° C. The tube was continuously rocked during this period. Upon cooling, isopropanol was added to the solution and the precipitate obtained thereby was washed three times with isopropanol and dried by heating at a temperature of 60° C. for 16 hours. About 1.63 grams of copolymer were recovered in this manner. Analysis showed the copolymer to be composed of 69.5 percent vinyl chloride and 30.5 percent 2,2,5,5-tetramethyl-N-vinyloxazolidinone-4. The polymer had a reduced viscosity of 0.46 in cyclohexanone. This compound is useful as a molding or film-forming material having improved heat stability.

Unless otherwise specified, all parts and percentages, as used throughout this specification, are by weight.

What is claimed is:

1. The N-vinyl ring-oxygenated lactams represented by the general formula

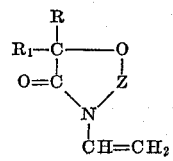

wherein Z is a member selected from the group consisting of —C(R₂)(R₃)— and —C(R₂)(R₃)—C(R₄)(R₅)—, and R, R₁, R₂, R₃, R₄ and R₅ are members selected from the group consisting of hydrogen and hydrocarbon radicals having from 1 to 18 carbon atoms.

2. A monomeric compound of the formula:

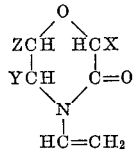

wherein X, Y and Z are each independently selected from the group consisting of hydrogen and alkyl radicals that contain from one to about four carbon atoms.

3. Monomeric N-vinyl-3-morpholinone.
4. 2,2,5,5-tetramethyl-N-vinyloxazolidinone-4.
5. A process for producing N-vinyl ring-oxygenated lactams represented by the general formula

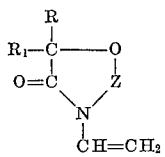

wherein Z is a member selected from the group consisting of —C(R₂)(R₃)— and —C(R₂)(R₃)—C(R₄)(R₅)—, and R, R₁, R₂, R₃, R₄ and R₅ are members selected from the group consisting of hydrogen and hydrocarbon radicals having from 1 to 18 carbon atoms, which comprises forming a mixture of acetylene, a ring-oxygenated lactam represented by the general formula

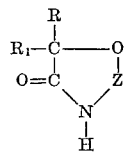

wherein Z, R, and R₁ are as above defined, and an alkali metal salt of such lactam, and heating the mixture at a temperature of from 110° C. to 200° C., and at a pressure of from 15 p.s.i. to 300 p.s.i., to cause said acetylene and said ring-oxygenated lactam to react to produce said N-vinyl ring-oxygenated lactams.

6. A process for producing N-vinyl ring-oxygenated lactams represented by the general formula

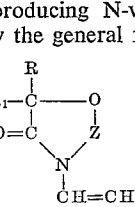

wherein Z is a member selected from the group consisting of —C(R₂)(R₃)— and —C(R₂)(R₃)—C(R₄)(R₅)—, and R, R₁, R₂, R₃, R₄ and R₅ are members selected from the group consisting of hydrogen and hydrocarbon radicals having from 1 to 18 carbon atoms, which comprises forming a mixture of acetylene, a ring-oxygenated lactam represented by the general formula

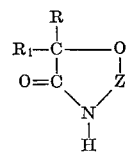

wherein Z, R, and R₁ are as above defined, and an alkali metal, and heating the mixture at a temperature of from 110° C. to 200° C., and at a pressure of from 15 p.s.i. to 300 p.s.i. to cause said acetylene and said ring-oxygenated lactam to react to produce said N-vinyl ring-oxygenated lactams.

7. A process as in claim 5 wherein the alkali metal salt is a potassium salt.
8. A process as in claim 6 wherein the alkali metal is potassium.
9. A process for producing N-vinyl ring-oxygenated lactams represented by the general formula

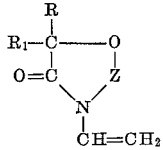

wherein Z is a member selected from the group consisting of —C(R₂)(R₃)— and —C(R₂)(R₃)—C(R₄)(R₅)—, and R, R₁, R₂, R₃, R₄ and R₅ are members selected from the group consisting of hydrogen and hydrocarbon radicals having from 1 to 18 carbon atoms, which comprises forming a mixture of acetylene, a ring-oxygenated lactam represented by the general formula

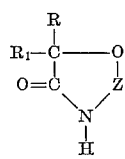

wherein Z, R, and R₁ are as above defined, an alkali metal salt of such lactam, and an inert liquid solvent in which said acetylene, lactam, and alkali metal salt are soluble, and heating the mixture under a pressure of from 15 p.s.i. to 300 p.s.i. at a temperature of from 110° C. to 200° C., to cause said acetylene and said ring-oxygenated lactam to react to produce said N-vinyl ring-oxygenated lactams.

10. A process as in claim 9 wherein the alkali metal salt is a potassium salt.
11. A process for producing N-vinyl-3-morpholinone which comprises forming a mixture of acetylene, 3-morpholinone, an alkali metal salt of 3-morpholinone, and an inert liquid solvent in which said acetylene, 3-morpholinone, and alkali metal salt are soluble, and heating the mixture under a pressure of from 15 p.s.i. to 300 p.s.i. at a temperature of from 110° C. to 200° C., to cause said acetylene and said 3-morpholinone to react to produce said N-vinyl-3-morpholinone.

12. A process for producing 2,2,5,5-tetramethyl-N-vinyloxazolidinone-4 which comprises forming a mixture of acetylene, 2,2,5,5-tetramethyloxazolidinone-4, an alkali metal salt of 2,2,5,5-tetramethyloxazolidinone-4, and an inert liquid solvent in which said acetylene, 2,2,5,5-tetramethyloxazolidinone-4 and alkali metal salt are soluble, and heating the mixture under a pressure of from 15 p.s.i. to 300 p.s.i. at a temperature of from 110° C. to 200° C. to cause said acetylene and said 2,2,5,5-tetramethyloxazolidinone-4 to react to produce said 2,2,5,5-tetramethyl-N-vinyl-oxazolidinone-4.

13. A composition of matter comprising a polymer having as an essential constituent of its polymeric structure material interpolymerized proportions of the recurring group:

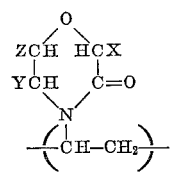

wherein X, Y and Z are each independently selected from the group consisting of hydrogen and alkyl radicals that contain from one to about four carbon atoms.

14. A homopolymer according to claim 13.
15. Method for the preparation of a polymer product having, as an essential constituent of its polymeric structure, material interpolymerized proportions of the recurring group of the Formula II

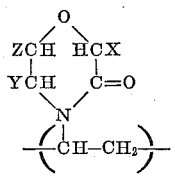

wherein X, Y and Z are each independently selected from the group consisting of hydrogen and alkyl radicals that contain from one to about four carbon atoms, which method comprises polymerizing a quantity of polymerizable monomer containing, as an essential ingredient, a material proportion of a monomer of the Formula I;

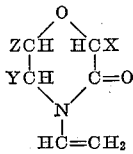

wherein X, Y and Z are as defined in the Formula II, any balance of monomer in said quantity of polymerizable monomer that is different from said monomer of the Formula I being another ethylenically unsaturated monomeric material that is interpolymerizable with said monomer of the Formula I.

16. The method claim 15, wherein a homopolymer is prepared by polymerizing a quantity of polymerizable monomer consisting entirely of one of said monomers of said Formula I.

17. Poly-N-vinyl-3-morpholinone.

18. A homopolymer of 2,2,5,5-tetramethyl-N-vinyloxazolidinone-4.

19. A copolymer of N-vinyl-3-morpholinone and vinyl chloride.

20. A copolymer of 2,2,5,5-tetramethyl-N-vinyloxazolidinone-4 and vinyl chloride.

21. A copolymer of 2,2,5,5-tetramethyl-N-vinyloxazolidinone-4 and acrylonitrile.

22. A process for producing a homopolymer of N-vinyl-3-morpholinone which comprises forming a mixture of N-vinyl-3-morpholinone and a vinyl polymerization catalyst, and heating said mixture at an elevated temperature to cause homopolymerization of said N-vinyl-3-morpholinone.

23. A process for producing a homopolymer of 2,2,5,5-tetramethyl - N - vinyloxazolidinone - 4 which comprises forming a mixture of 2,2,5,5-tetramethyl-N-vinyloxazolidinone-4 and a vinyl polymerization catalyst, and heating said mixture at an elevated temperature to cause homopolymerization of said 2,2,5,5-tetramethyl-N-vinyloxazolidinone-4.

24. A process for producing a copolymer of N-vinyl-3-morpholinone and vinyl chloride which comprises forming a mixture of N-vinyl-3-morpholinone, vinyl chloride, and a vinyl polymerization catalyst, and heating said mixture at an elevated temperature to cause copolymerization of said N-vinyl-3-morpholinone and said vinyl chloride.

25. A process for producing a copolymer of 2,2,5,5-tetramethyl-N-vinyloxazolidinone-4 and vinyl chloride which comprises forming a mixture of 2,2,5,5-tetramethyl-N-vinyloxazolidinone-4, vinyl chloride, and a vinyl polymerization catalyst, and heating said mixture at an elevated temperature to cause copolymerization of said 2,2,5,5-tetramethyl-N-vinyloxazolidinone-4 and said vinyl chloride.

26. A process for producing a copolymer of 2,2,5,5-tetramethyl - N - vinyloxazolidinone - 4 and acrylonitrile which comprises forming a mixture of 2,2,5,5-tetramethyl-N-vinyloxazolidinone-4, acrylonitrile, and a vinyl polymerization catalyst, and heating said mixture at an elevated temperature to cause copolymerization of said 2,2,5,5-tetramethyl-N-vinyloxazolidinone-4 and said acrylonitrile.

27. A composition of matter comprising a high polymer having as an essential constituent of its polymeric structural material interpolymerized proportions of the recurring group:

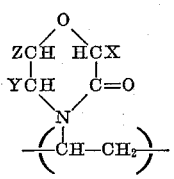

wherein X, Y and Z are each independently selected from the group consisting of hydrogen and alkyl radicals that contain from one to about four carbon atoms.

28. A high molecular weight homopolymer according to claim 27.

References Cited by the Examiner
UNITED STATES PATENTS

| | | | |
|---|---|---|---|
| 2,231,905 | 2/1941 | Hanford | 260—247.7 |
| 2,317,804 | 4/1943 | Reppe et al. | 260—239.3 |
| 2,490,572 | 12/1949 | Anish | 260—240.1 |
| 2,500,121 | 3/1950 | Dickey et al. | 260—85.5 |
| 2,560,694 | 7/1951 | Howard | 260—85.5 |
| 2,768,148 | 10/1956 | Schildknecht et al. | 260—85.5 |
| 2,806,848 | 9/1957 | Nedwick | 260—239.3 |
| 2,818,399 | 12/1957 | Drechsel | 260—307.3 |
| 2,822,355 | 2/1958 | Werner | 260—87.5 |
| 2,891,058 | 6/1959 | Walles et al. | 260—247.7 |
| 2,905,690 | 9/1960 | Bakke | 260—88.3 |
| 2,946,772 | 7/1960 | Walles et al. | 260—307.3 |
| 2,987,509 | 6/1961 | Burgert | 260—88.3 |

FOREIGN PATENTS

| | | |
|---|---|---|
| 743,825 | 1/1956 | Great Britain. |
| 940,981 | 3/1956 | Germany. |

OTHER REFERENCES

Dietrich et al.: German printed patent application C 10,125 IV b/12P, opened to public July 19, 1956 (2 pages), 260–247.7.

Ham: Textile Research Journ., vol. 24, pages 597–599 (1954), 260–85.5 R, available Sci. Lib., Patent Office, Washington 25, D.C.

Lesser: Drug and Cosmetic Ind., vol. 75, page 32 (1954), 260–326.5, available Sci. Lib., Patent Office, Washington 25, D.C.

JOSEPH L. SCHOFER, Primary Examiner.

H. J. LIDOFF, MILTON STERMAN, H. N. BURSTEIN, P. E. MANGAN, J. R. LIBERMAN, Examiners.